United States Patent
Bierbrauer et al.

(10) Patent No.: US 6,944,815 B2
(45) Date of Patent: Sep. 13, 2005

(54) TECHNIQUE FOR CONTENT OFF-LOADING IN A DOCUMENT PROCESSING SYSTEM USING STUB DOCUMENTS

(75) Inventors: Matthias Stefan Bierbrauer, Stuttgart (DE); Daniel Haenle, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/015,302

(22) Filed: Dec. 12, 2001

(65) Prior Publication Data

US 2002/0078081 A1 Jun. 20, 2002

(30) Foreign Application Priority Data

Dec. 15, 2000 (EP) .......................................... 00127581

(51) Int. Cl.[7] .............................................. G06F 17/00
(52) U.S. Cl. ...................................... 715/500; 715/530
(58) Field of Search ................................ 715/500, 530, 715/513; 707/1, 10; 709/206, 207, 232

(56) References Cited

U.S. PATENT DOCUMENTS

| | | | | |
|---|---|---|---|---|
| 5,781,901 A | * | 7/1998 | Kuzma | ........................ 707/10 |
| 5,862,325 A | * | 1/1999 | Reed et al. | .................. 709/201 |
| 5,890,163 A | * | 3/1999 | Todd | ........................... 707/200 |
| 6,216,165 B1 | * | 4/2001 | Woltz et al. | ................. 709/232 |
| 6,505,236 B1 | * | 1/2003 | Pollack | ........................ 709/206 |
| 6,505,237 B2 | * | 1/2003 | Beyda et al. | ................ 709/206 |
| 2002/0016818 A1 | * | 2/2002 | Kirani et al. | ................ 709/203 |
| 2002/0038296 A1 | * | 3/2002 | Margolus et al. | .............. 707/1 |
| 2002/0065892 A1 | * | 5/2002 | Malik | ......................... 709/206 |

* cited by examiner

*Primary Examiner*—Sanjiv Shah
(74) *Attorney, Agent, or Firm*—Gregory M. Doudnikoff

(57) ABSTRACT

A technique for handling document or content off-loading from a document processing system to a large repository is disclosed. A document including any possible attachments is copied to a remote repository. The original document in the document processing system is stripped down to a stub document containing at least the information required to retrieve the copied document from the remote repository and enough information for a user to be able to identify the document. If the user wants to view the original document, the stored document is retrieved from the repository. The previously deleted content is re-inserted into the stub document from the retrieved document to restore the original document. The proposed technique is less resource consuming than the prior art approaches and can advantageously be used in mail clients where mail, potentially including attachments, is archived on a remote mail server.

8 Claims, 2 Drawing Sheets

TECHNIQUE FOR CONTENT OFF-LOADING IN A DOCUMENT PROCESSING SYSTEM USING STUB DOCUMENTS

RELATED INVENTIONS

IBM patent application Ser. No. 10/015,301, entitled "Method and System for Automized and Synchronous Execution of Customized Code on Off-Loaded Retrieved Documents in a Document Processing System", filed concurrently herewith on Dec. 12, 2001 and IBM application Ser. No. 10/015,472, entitled "Method and System for Off-Loading and Retrieving Document Content in a Document Processing System", filed concurrently herewith on Dec. 12, 2001, are related to this invention.

BACKGROUND OF THE INVENTION

1. Field of the Invention

The invention relates to data processing environments with large document repositories and, more specifically, to a technique for handling content off-loading from a document processing system to a remote repository.

2. Description of the Related Art

Mailing client applications, such as Lotus™ Notes™ or Microsoft™ Outlook™, have a problem in that they contain continuously growing document repositories. These repositories store the incoming and outgoing notes or emails which often include large attachments such as text documents, graphics or even storage consuming digitized pictures. The notes and emails will be referred to hereafter as documents. As the repository grows larger, performance becomes a problem and storage resources can be used up. To keep the size of the repository manageable, a Lotus Notes application uses a Lotus Domino™ database from which a tool like IBM Content Manager CommonStore™ for Lotus Domino (CSLD) is used to move documents stored in that database to an archive physically located on a different device like a tape storage. CSLD thereupon permits a user access to documents that have previously been archived. Lotus, Notes, Domino and CommonStore are registered trademarks or trademarks of Lotus Development Corp. and/or International Business Machines Corporation (IBM), and Mircrosoft and Outlook are trademarks of Mircosoft Corp.

CSLD also permits access to documents that have been archived from any archive client application (e.g., scanning applications, CommonStore for SAP™, etc.). When a document is retrieved from the archive to a Notes database, a Lotus Notes document is created. SAP is a trademark of SAP AG.

IBM Content Manager CommonStore™ for Lotus Domino (CSLD) is a tool for moving Lotus Notes documents in various formats to an archive. CSLD also allows access to documents that have been archived from any archive client application (e.g., scanning applications, CommonStore for SAP™, etc). When documents are retrieved from the archive to a Notes database, a Lotus Notes document is created.

The IBM Archive Content Manager and another tool called OnDemand maintain an index about archived documents. This means that archived documents can be deleted from Lotus Notes, since it is possible to find them later by searching the archive's index. In contrast, Tivoli Storage Manager (TSM) does not provide an index of its own, but rather leaves it up to the archiving application to maintain an index. That is, TSM itself does not allow searching for archived documents.

CSLD uses the original documents within Notes to maintain the index. When a Notes document is archived via CSLD, it is assigned a unique identifier (ID) by the archive. CSLD generally writes this document archive ID to a field in the original Notes document. This allows retrieval of an archived document by ID without performing a search in the archive.

A drawback of the above prior art approaches is that when a document is deleted from Notes, the link to the archived document is completely lost. With Content Manager and OnDemand, the archived document could still be retrieved via an archive search. For TSM, however, since it does not provide an index to search over, there is no way to retrieve an archived document once the only Notes document containing the link to it is deleted. Therefore, CSLD does not allow deleting a document from Notes that has been archived to TSM.

However, there is a need also for CSLD to release expensive disk space by archiving/off-loading complete Notes documents.

SUMMARY OF THE INVENTION

Accordingly, an object of the present invention is to provide a method and system for handling content off-loading to a large document repository, which are less resource consuming than the prior art approaches.

Another object is to provide a user-friendly mechanism for off-loading and retrieving content.

The concept of the invention is that a document including any possible attachments is copied to a remote repository and stripped down to a stub document containing at least the information required to retrieve the copied document from the remote repository. During retrieval, the retrieved content is re-inserted into the stub document to restore the original document.

In other words, the invention proposes that document processing be performed on an original document such that certain content is cut-off or separated from the original document. This content is deleted from the original document, leaving a stub document in its place. The complete original document migrated (off-loaded) to the remote repository. In the stripped-down document which remains, only information which enables identification the off-loaded document on the remote repository and retrieval of it from the remote repository is provided. A few descriptive parts of the document are left in the stub document which allow the user to identify the stub document in the document processing system.

The original document and the stub document have the same document ID in the underlying document processing system. Therefore, although the document has been off-loaded, existing links to it remain still valid.

It is emphasized that the original document and the stub document are the same document just in two different versions, not being clones, placeholders or even copies.

The proposed mechanism is less resource consuming than the prior art approaches and can advantageously be used in mail clients where mails potentially including attachments are archived on a remote mail server. As a first, storage is released due to the proposed 'down-stripping' of the original documents. Secondly, since the stub documents still contain a few descriptive fields, it is possible to search for off-loaded documents in the document processing system, although the remote repository may not provide a search index or mechanism.

It is understood that the remote repository can be located on a local hard disk.

BRIEF DESCRIPTION OF THE DRAWINGS

In the following, the present invention is described in more detail from which further features and advantages of the invention become evident, whereby.

DESCRIPTION OF THE PREFERRED EMBODIMENT

Figure 1:
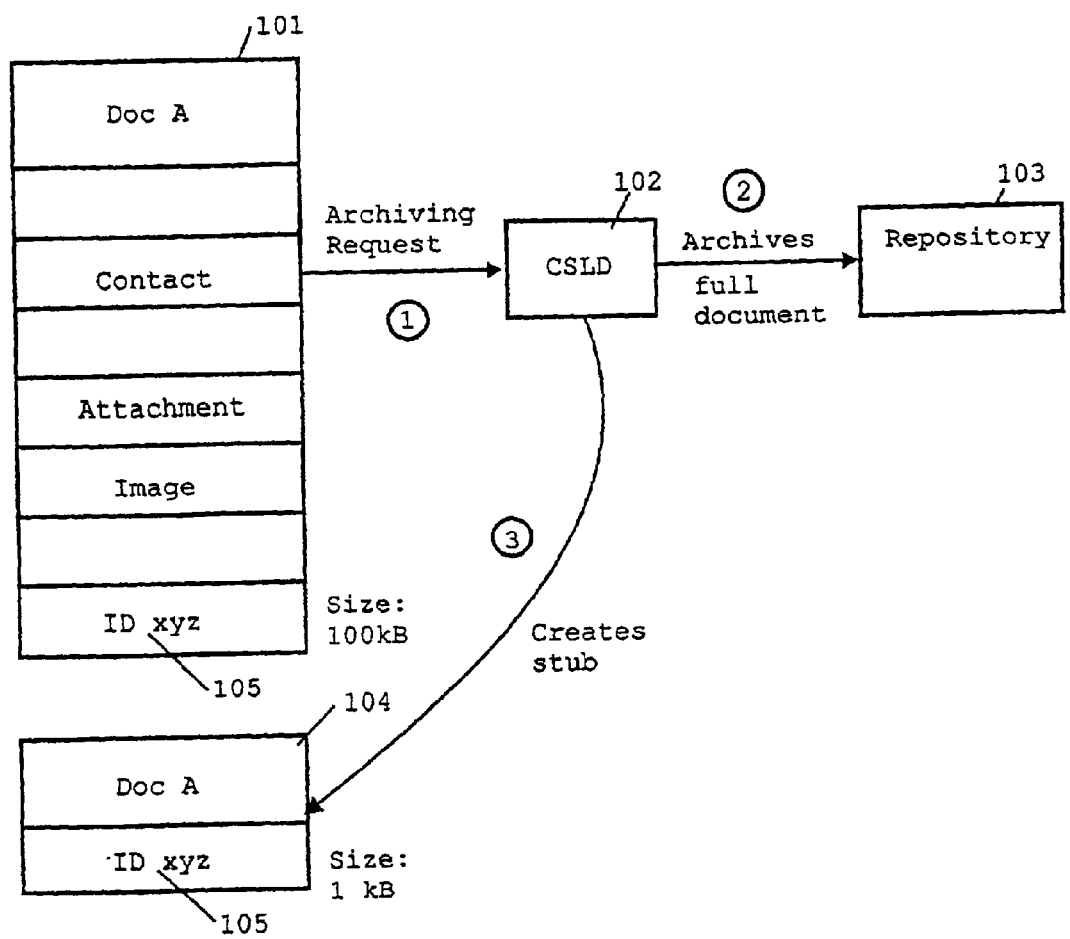
FIG. 1 is a flow diagram illustrating the various steps to archive a document and create a stub document from it, in accordance with the invention.

Referring to FIG. 1, an archiving request for a Lotus Notes document 101 is issued to IBM Content Manager CommonStore™ for Lotus Domino (CSLD) 102 which copies the document 101 to a remote archive 103. The remote archive 103 is an example of a document repository. After archiving the document 101, CSLD 102 creates a stub document 104 from the original document 101 by stripping it down (deleting content). The original document 101 (a copy of which is in the archive 103) and the stripped-down document 104 have the same document ID 105. The document ID 105 is not deleted during the stripping-down process.

The size of a stub document is only a small percentage of the size of the original document. In the present example, the stripping-down process reduces the document size of the original Lotus Notes document from 100 kByte to about 1 kByte.

In CSLD, when a document has been archived successfully, it can be converted to a stub automatically and synchronously by applying LotusScript or Java code to it. This code can be customized so that administrators can decide which items to remove from documents.

The above general description and the following described mechanism for creating stub files is for an implementation in which the document processing system is Lotus Notes. But it is noteworthy that the underlying concept of the invention can be applied also to other document processing environments. Technically, documents in Lotus Notes are basically a collection of items. All content except attachments and OLE objects is kept in items. Therefore, a stub document in that environment is a Notes document from which all large items have been removed. Further, a stub contains an item that contains a link to the archived document.

In addition, the stub document retains just enough information to allow the document to be displayed in a view or folder, and the document's readers fields. For example, a stub of a Notes email (memo) should contain the sender, receiver list, date/time the mail was sent, the subject and the link to the archived document. When a stub document is displayed in a view/folder, it cannot be distinguished from regular Notes documents (documents that have not gone through the stripping-down process), since it contains all items to be displayed in the view/folder.

Figure 2:
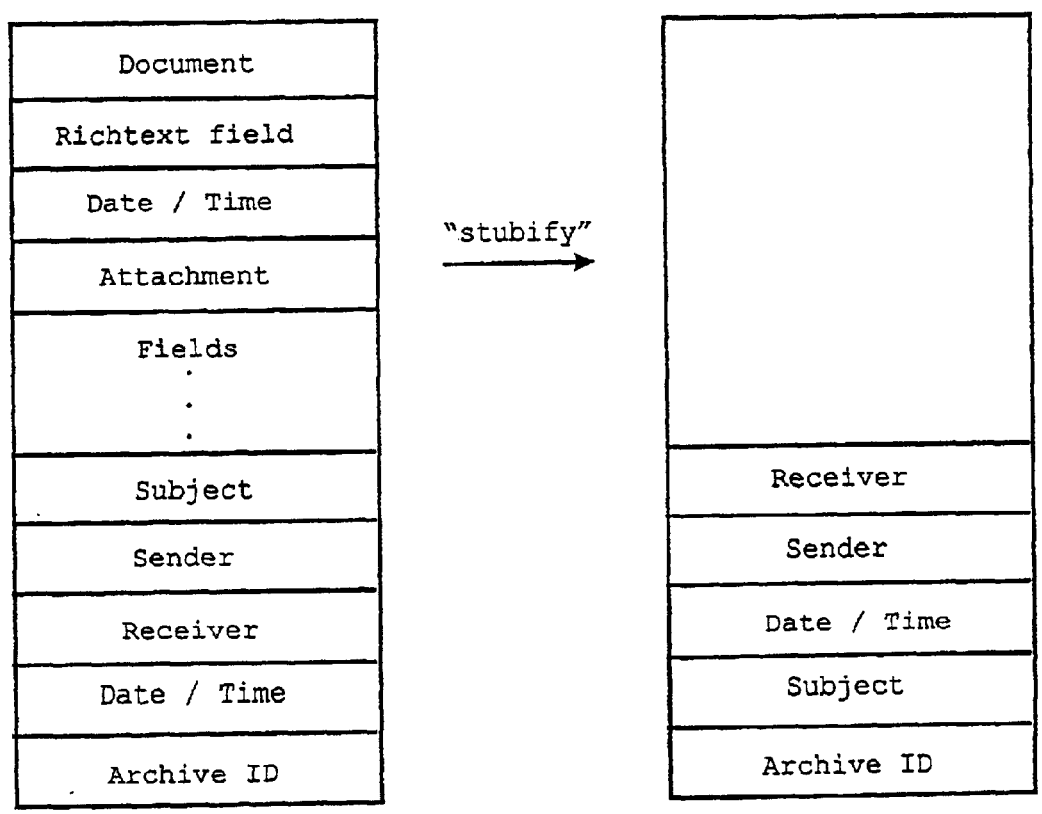
FIG. 2 schematically shows he structure of a Louts Notes document before and after stripping it down to a stub document according to the invention.

Now referring to FIG. 2, FIG. 2 illustrates how a Lotus Notes email document containing an attachment and various other fields is converted to a stub document in accordance with the invention. The stripping-down process leaves only those fields that are necessary to identify emails among other emails. In the present example, these fields include the 'Subject', 'Mail Sender', 'Mail Recipients', and the date and time the email was posted. Also, the link to the archived document is placed in the stub document.

The following description is directed to an underlying generic document processing system. The description provides more detail regarding how searching for stub documents and retrieving archived documents are handled according to the invention.

Searching for Stub Documents

As mentioned before, stub documents are regular documents containing a few descriptive fields. Therefore, the search mechanism provided by the document processing system, e.g., a full text search, can be used to find even stub documents. Once a stub document is found, the original document can be restored via the archive ID stored in the stub document.

Retrieving Archived Documents by Overwriting Stubs

Once a stub is found after a predescribed search, a user can retrieve the corresponding archived (complete) document. CSLD extracts the archive ID from the stub document, and retrieves the document from the archive using the archive ID. Then, the content of the archived document is re-inserted into the stub document. This will restore the original document completely. Even the document's unique ID (UNID) and security properties are preserved.

It is emphasized that the proposed stub creation technique is not useful only when the above described Tivoli Storage Manager is used as the archive or repository. Even when the archive supports an index, one can create stubs from documents being archived instead of deleting them after archiving. This permits searching for archived documents in the document processing system, instead of searching in the archive. The search results are returned much faster than searching the archive.

What is claimed is:

1. A method for handling content off-loading from documents in a document processing system to a repository, comprising the steps of:

storing a copy of an original document from the document processing system in the repository;

stripping content from the original document in the document processing system to form a stub document, the stub containing at least information to enable automatic retrieval of the stored document from the repository when the stub document is selected by a user; and maintaining the stub document in the document processing system.

2. A method according to claim 1, wherein the stub document includes descriptive parts of the original document so that the stub document can be identified by the user in the document processing system.

3. A method according to claim 1, wherein the stub document contains a link to the stored document in the repository.

4. A method according to claim 1, further comprising the steps of:

retrieving the stored document from the repository when a user attempts to open the stub document; and inserting content into the stub document from the stored document to restore the original document.

5. A method according to claim 1, wherein said stripping step preserves a unique document identifier in the stub document to keep a link to the stored document valid.

6. In a computing environment, a system for handling content off-loading from documents in a document processing system to a repository, said system comprising:

means for copying an original document from the document processing system to the repository;

means for deleting content from the original document in the document processing system to create a stub document in the document processing system, the stub document containing information to enable automatic retrieval of the copied document from the repository upon selection of the stub document by a user; and maintaining the stub document in the document processing system.

7. A system for handling content off-loading according to claim 6, further comprising:

means for retrieving the copied document using the information in the stub document when the user selects to open the stub document; and means for inserting content into the stub document from the retrieved document to restore the original document.

8. Computer-readable code for execution in a data processing system for handling content off-loading from documents in a document processing system to a repository, said code comprising:

first subprocesses for storing a copy of an original document from the document processing system in the repository;

second subprocesses for stripping content from the original document in the document processing system to form a stub document, the stub containing information to enable retrieval of the stored document from the repository and to identify the stub document to a user;

third subprocesses for retrieving the stored document from the repository upon a request to open the original document; and fourth subprocesses for recreating the original document in the document processing system utilizing the stub document and the retrieved document.

* * * * *